US009479568B2

(12) United States Patent
Collin

(10) Patent No.: US 9,479,568 B2
(45) Date of Patent: Oct. 25, 2016

(54) APPLICATION SWITCHER

(75) Inventor: Richard Michael Collin, Newick (GB)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 13/814,681

(22) PCT Filed: Dec. 28, 2011

(86) PCT No.: PCT/EP2011/074182
§ 371 (c)(1),
(2), (4) Date: May 10, 2013

(87) PCT Pub. No.: WO2013/097896
PCT Pub. Date: Jul. 4, 2013

(65) Prior Publication Data
US 2014/0304612 A1 Oct. 9, 2014

(51) Int. Cl.
G06F 3/0481 (2013.01)
H04L 29/08 (2006.01)
G06F 9/44 (2006.01)
G06F 3/0484 (2013.01)
G06F 9/48 (2006.01)
H04M 1/725 (2006.01)

(52) U.S. Cl.
CPC ........... H04L 67/10 (2013.01); G06F 3/04842 (2013.01); G06F 9/4443 (2013.01); G06F 9/4843 (2013.01); H04M 1/7253 (2013.01)

(58) Field of Classification Search
CPC combination set(s) only.
See application file for complete search history.

(56) References Cited

U.S. PATENT DOCUMENTS

| 5,016,166 | A | 5/1991 | Van Loo et al. |
| 5,127,098 | A | 6/1992 | Rosenthal et al. |
| 6,154,843 | A * | 11/2000 | Hart et al. ....................... 726/21 |
| 6,311,209 | B1 * | 10/2001 | Olson et al. .................... 709/204 |
| 6,463,299 | B1 * | 10/2002 | Macor ............................ 455/556.1 |
| 6,545,669 | B1 | 4/2003 | Kinawi et al. |
| 6,906,646 | B1 | 6/2005 | Mills et al. |
| 6,947,975 | B2 * | 9/2005 | Wong et al. ................... 709/217 |

(Continued)

FOREIGN PATENT DOCUMENTS

| CN | 1658149 | 8/2005 |
| CN | 101095110 | 12/2007 |

(Continued)

OTHER PUBLICATIONS

International Search Report for Application No. PCT/EP2011/074178 dated May 15, 2012.
International Search Report for Application No. PCT/EP2011/074182 dated Mar. 22, 2012.
International Search Report for Application No. PCT/EP2011/074193 dated Sep. 14, 2012.
International Search Report for Application No. PCT/US2012/071628 dated Feb. 9, 2013.

(Continued)

*Primary Examiner* — Phenuel Salomon
(74) *Attorney, Agent, or Firm* — Alston & Bird LLP

(57) ABSTRACT

In one or more embodiments described herein, there is provided an apparatus comprising at least one processor; and at least one memory having computer program code stored thereon, the at least one memory and computer program code being configured to, when run on the at least one processor, cause the apparatus to provide an application switcher to a first device, the application switcher providing an indication of content available to the first device from one or more open applications on a second device, wherein at least part of the content of the one or more open applications of the second device is shareable in real time with an application on the first device; and provide, in response to user-selection of content from the application switcher, the user-selected shareable content of the open application of the second device for use on the first device using a first device application.

19 Claims, 5 Drawing Sheets

(56) References Cited

U.S. PATENT DOCUMENTS

| | | | |
|---|---|---|---|
| 7,363,342 B1 | 4/2008 | Wang et al. | |
| 7,371,177 B2 | 5/2008 | Ellis et al. | |
| 7,475,397 B1 | 1/2009 | Garthwaite et al. | |
| 7,479,949 B2* | 1/2009 | Jobs | G06F 3/0488 345/169 |
| 7,529,824 B2 | 5/2009 | Joseph | |
| 7,532,196 B2 | 5/2009 | Hinckley | |
| 7,533,189 B2 | 5/2009 | Mahajan et al. | |
| 7,536,034 B2 | 5/2009 | Rhoads et al. | |
| 7,620,906 B2* | 11/2009 | Igeta | 715/769 |
| 7,623,892 B2* | 11/2009 | Hawkins | 455/556.1 |
| 7,636,794 B2 | 12/2009 | Ramos et al. | |
| 7,703,073 B2 | 4/2010 | Illowsky et al. | |
| 7,716,286 B2 | 5/2010 | Heins et al. | |
| 7,761,885 B2 | 7/2010 | Labrou et al. | |
| 7,817,991 B2 | 10/2010 | Hinckley et al. | |
| 7,860,019 B2 | 12/2010 | Zhang et al. | |
| 7,890,517 B2 | 2/2011 | Angelo et al. | |
| 7,920,169 B2 | 4/2011 | Jung et al. | |
| 7,958,453 B1 | 6/2011 | Taing | |
| 7,991,896 B2 | 8/2011 | Shen et al. | |
| 8,019,867 B1 | 9/2011 | Allen et al. | |
| 8,078,646 B2 | 12/2011 | Das et al. | |
| 8,214,747 B1 | 7/2012 | Yankovich et al. | |
| 8,224,894 B1* | 7/2012 | Parks | H04W 4/008 709/203 |
| 8,255,360 B1 | 8/2012 | Wallace et al. | |
| 8,332,606 B2 | 12/2012 | Boldyrev et al. | |
| 8,588,824 B2* | 11/2013 | Rowe | H04N 21/4126 386/231 |
| 8,656,080 B2* | 2/2014 | Shin | 710/310 |
| 8,751,444 B2 | 6/2014 | Wallace et al. | |
| 8,812,987 B2* | 8/2014 | Joynes et al. | 715/836 |
| 8,874,585 B2 | 10/2014 | Oliver et al. | |
| 2003/0126136 A1 | 7/2003 | Omoigui | |
| 2004/0006551 A1* | 1/2004 | Sahinoja et al. | 707/1 |
| 2004/0019676 A1* | 1/2004 | Iwatsuki | H04L 69/329 709/224 |
| 2004/0024819 A1 | 2/2004 | Sasaki et al. | |
| 2004/0054690 A1 | 3/2004 | Hillerbrand et al. | |
| 2004/0117409 A1 | 6/2004 | Scahill et al. | |
| 2004/0150664 A1 | 8/2004 | Baudisch | |
| 2004/0150724 A1 | 8/2004 | Nozaki et al. | |
| 2004/0203891 A1 | 10/2004 | Cole et al. | |
| 2004/0230636 A1 | 11/2004 | Masuoka et al. | |
| 2005/0028221 A1 | 2/2005 | Liu et al. | |
| 2005/0030255 A1 | 2/2005 | Chiu et al. | |
| 2005/0055330 A1 | 3/2005 | Britton et al. | |
| 2005/0060179 A1 | 3/2005 | Tinberg et al. | |
| 2005/0086309 A1 | 4/2005 | Galli et al. | |
| 2005/0120096 A1 | 6/2005 | Rekimoto et al. | |
| 2005/0165795 A1 | 7/2005 | Myka et al. | |
| 2005/0168399 A1 | 8/2005 | Palmquist | |
| 2005/0198578 A1 | 9/2005 | Agrawala et al. | |
| 2005/0204141 A1 | 9/2005 | Sayers et al. | |
| 2005/0204296 A1 | 9/2005 | Rossler et al. | |
| 2005/0219211 A1 | 10/2005 | Kotzin et al. | |
| 2005/0219223 A1 | 10/2005 | Kotzin et al. | |
| 2005/0254514 A1 | 11/2005 | Lynn | |
| 2005/0289134 A1 | 12/2005 | Noguchi | |
| 2005/0289558 A1 | 12/2005 | Illowsky et al. | |
| 2006/0004834 A1 | 1/2006 | Pyhalammi et al. | |
| 2006/0028458 A1 | 2/2006 | King et al. | |
| 2006/0041893 A1* | 2/2006 | Castro | H04L 67/02 719/320 |
| 2006/0101054 A1 | 5/2006 | Dempski et al. | |
| 2006/0123011 A1 | 6/2006 | Stillion et al. | |
| 2006/0123039 A1 | 6/2006 | Scheuerle, Jr. et al. | |
| 2006/0236302 A1 | 10/2006 | Bateman et al. | |
| 2006/0236307 A1 | 10/2006 | Debruin et al. | |
| 2006/0242278 A1 | 10/2006 | Hawkins | |
| 2006/0284758 A1 | 12/2006 | Stilwell et al. | |
| 2006/0284785 A1 | 12/2006 | Bitterlich | |
| 2006/0284795 A1 | 12/2006 | Akiyama et al. | |
| 2007/0054627 A1* | 3/2007 | Wormald | G06F 9/4856 455/70 |
| 2007/0118394 A1 | 5/2007 | Cahoon | |
| 2007/0124503 A1 | 5/2007 | Ramos et al. | |
| 2007/0127426 A1 | 6/2007 | Watters et al. | |
| 2007/0146347 A1 | 6/2007 | Rosenberg | |
| 2007/0242061 A1 | 10/2007 | Rhoten et al. | |
| 2007/0250645 A1 | 10/2007 | Meadows et al. | |
| 2008/0081558 A1* | 4/2008 | Dunko | G11B 27/002 455/41.1 |
| 2008/0104032 A1 | 5/2008 | Sarkar | |
| 2008/0120343 A1 | 5/2008 | Altrichter et al. | |
| 2008/0154907 A1* | 6/2008 | Prasad | G06F 17/3005 |
| 2008/0160974 A1 | 7/2008 | Vartiainen et al. | |
| 2008/0207128 A1 | 8/2008 | Mikko | |
| 2008/0215989 A1 | 9/2008 | Kravtsova et al. | |
| 2008/0288913 A1 | 11/2008 | Creighton et al. | |
| 2008/0294644 A1 | 11/2008 | Liu et al. | |
| 2008/0297608 A1 | 12/2008 | Border et al. | |
| 2009/0006949 A1 | 1/2009 | Takeuchi | |
| 2009/0031258 A1 | 1/2009 | Arrasvuori et al. | |
| 2009/0058830 A1* | 3/2009 | Herz | G06F 3/044 345/173 |
| 2009/0119572 A1 | 5/2009 | Koivunen | |
| 2009/0143056 A1* | 6/2009 | Tang | H04M 1/7253 455/418 |
| 2009/0172101 A1 | 7/2009 | Arthursson | |
| 2009/0172565 A1 | 7/2009 | Jackson et al. | |
| 2009/0172671 A1 | 7/2009 | Bobak et al. | |
| 2009/0177777 A1 | 7/2009 | Behrendt et al. | |
| 2009/0204966 A1 | 8/2009 | Johnson et al. | |
| 2009/0213032 A1 | 8/2009 | Newport et al. | |
| 2009/0216714 A1 | 8/2009 | Gonzalez et al. | |
| 2009/0265686 A1 | 10/2009 | Lucas et al. | |
| 2009/0300493 A1 | 12/2009 | Hamilton, II et al. | |
| 2009/0303676 A1 | 12/2009 | Behar et al. | |
| 2009/0313645 A1 | 12/2009 | Sathish et al. | |
| 2009/0327302 A1 | 12/2009 | Richardson et al. | |
| 2010/0054242 A1 | 3/2010 | Oliver et al. | |
| 2010/0057815 A1 | 3/2010 | Spivack et al. | |
| 2010/0066643 A1 | 3/2010 | King et al. | |
| 2010/0070740 A1 | 3/2010 | Allen et al. | |
| 2010/0071038 A1* | 3/2010 | Flynn et al. | 726/5 |
| 2010/0082136 A1 | 4/2010 | Rosenblatt et al. | |
| 2010/0093399 A1* | 4/2010 | Kim | H04M 1/0202 455/566 |
| 2010/0138756 A1 | 6/2010 | Saund et al. | |
| 2010/0156812 A1 | 6/2010 | Stallings et al. | |
| 2010/0167646 A1 | 7/2010 | Alameh et al. | |
| 2010/0185956 A1 | 7/2010 | Anantharaman et al. | |
| 2010/0198778 A1 | 8/2010 | Venugopal et al. | |
| 2010/0231735 A1 | 9/2010 | Burian et al. | |
| 2010/0241634 A1 | 9/2010 | Madhok | |
| 2010/0257251 A1 | 10/2010 | Mooring et al. | |
| 2010/0259486 A1 | 10/2010 | Anson et al. | |
| 2010/0262925 A1* | 10/2010 | Liu | G06Q 10/10 715/759 |
| 2010/0274804 A1 | 10/2010 | Muskal et al. | |
| 2010/0274858 A1 | 10/2010 | Lindberg et al. | |
| 2010/0281363 A1 | 11/2010 | Inaba | |
| 2010/0281395 A1 | 11/2010 | Apted | |
| 2010/0287513 A1 | 11/2010 | Singh et al. | |
| 2010/0293106 A1 | 11/2010 | Rhoads et al. | |
| 2010/0299436 A1 | 11/2010 | Khalid et al. | |
| 2011/0018982 A1 | 1/2011 | Shibamiya et al. | |
| 2011/0019001 A1 | 1/2011 | Rhoads et al. | |
| 2011/0065384 A1 | 3/2011 | Gader et al. | |
| 2011/0066871 A1* | 3/2011 | Farmer | G06F 1/32 713/340 |
| 2011/0081923 A1 | 4/2011 | Forutanpour et al. | |
| 2011/0083111 A1 | 4/2011 | Forutanpour et al. | |
| 2011/0083130 A1 | 4/2011 | Boldyrev et al. | |
| 2011/0088002 A1 | 4/2011 | Freer | |
| 2011/0098056 A1 | 4/2011 | Rhoads et al. | |
| 2011/0107227 A1 | 5/2011 | Rempell et al. | |
| 2011/0113138 A1 | 5/2011 | Tyrkko et al. | |
| 2011/0117898 A1* | 5/2011 | Pereira | H04L 12/5835 455/414.4 |
| 2011/0126141 A1 | 5/2011 | King et al. | |

(56) References Cited

U.S. PATENT DOCUMENTS

| | | | |
|---|---|---|---|
| 2011/0131299 | A1 | 6/2011 | Sardary |
| 2011/0138381 | A1 | 6/2011 | Hauser |
| 2011/0158138 | A1 | 6/2011 | Vivek |
| 2011/0161076 | A1 | 6/2011 | Davis et al. |
| 2011/0165841 | A1 | 7/2011 | Baek et al. |
| 2011/0197153 | A1 | 8/2011 | King et al. |
| 2011/0239114 | A1 | 9/2011 | Falkenburg et al. |
| 2011/0244919 | A1 | 10/2011 | Aller et al. |
| 2011/0258430 | A1 | 10/2011 | Luukkala et al. |
| 2011/0276911 | A1* | 11/2011 | Choi ............................ 715/769 |
| 2011/0289147 | A1 | 11/2011 | Styles et al. |
| 2011/0289157 | A1 | 11/2011 | Pirnazar |
| 2011/0289520 | A1 | 11/2011 | Grigoriev et al. |
| 2011/0307841 | A1 | 12/2011 | Boldyrev et al. |
| 2011/0307857 | A1 | 12/2011 | Lucas et al. |
| 2012/0084356 | A1 | 4/2012 | Ferdi |
| 2012/0096076 | A1* | 4/2012 | Chan ................... G06F 9/4856 709/203 |
| 2012/0139951 | A1* | 6/2012 | Hwang ............... G06F 3/04883 345/665 |
| 2012/0290657 | A1 | 11/2012 | Parks et al. |
| 2012/0290730 | A1* | 11/2012 | Desai et al. .................. 709/228 |
| 2012/0317508 | A1* | 12/2012 | Schone ................... G06F 17/30 715/772 |
| 2013/0007499 | A1* | 1/2013 | Moy ..................... G06F 3/1423 713/400 |
| 2013/0013560 | A1 | 1/2013 | Goldberg et al. |
| 2013/0046935 | A1* | 2/2013 | Ramanathan ..... G06F 17/30132 711/119 |
| 2013/0047008 | A1* | 2/2013 | Shin ............................. 713/310 |
| 2013/0097234 | A1 | 4/2013 | Beinvel et al. |
| 2013/0262706 | A1 | 10/2013 | Stahlberg et al. |
| 2013/0275994 | A1 | 10/2013 | Uola et al. |

FOREIGN PATENT DOCUMENTS

| | | |
|---|---|---|
| CN | 101421686 A | 4/2009 |
| CN | 102150126 | 8/2011 |
| EP | 1215575 A2 | 6/2002 |
| EP | 1760584 A1 | 3/2007 |
| EP | 2106186 A1 | 9/2009 |
| EP | 2161960 A2 | 3/2010 |
| EP | 2261793 A2 | 12/2010 |
| EP | 2385462 A1 | 11/2011 |
| EP | 2487871 A1 | 8/2012 |
| GB | 2358778 A | 8/2001 |
| GB | 2384064 A | 7/2003 |
| GB | 2468893 A | 9/2010 |
| GB | 2498229 A | 7/2013 |
| JP | H11-95931 A | 4/1999 |
| JP | 2006-339835 A | 12/2006 |
| JP | 2009-130876 A | 6/2009 |
| JP | 2010-262330 A | 11/2010 |
| JP | 2011-065518 A | 3/2011 |
| KR | 2011 0056314 A | 5/2011 |
| KR | 2011 0080348 A | 7/2011 |
| WO | WO-2005/051020 A1 | 6/2005 |
| WO | WO-2005/109829 A1 | 11/2005 |
| WO | WO-2009/152316 A1 | 12/2009 |
| WO | WO-2010/063873 A1 | 6/2010 |
| WO | WO-2011/127201 A1 | 10/2011 |
| WO | WO 2013/097878 A1 | 7/2013 |

OTHER PUBLICATIONS

Search Report for Application No. GB1204842.7 dated May 25, 2012.
Search Report for Application No. GB1204849.2 dated May 25, 2012.
Search Report for Application No. GB1204857.5 dated May 25, 2012.
Bagrodia, R. et al., *iMash: Interactive Mobile Application Session Handoff;* Mobisys; The International Conference on Mobile Systems, Applications and Services (2003) pp. 1-14.
Chong, M. K. et al., *GesturePIN: Using Discrete Gestures for Associating Mobile Devices,* MobileHCI'10, Sep. 7-10, 2010, Lisbon, Portugal, pp. 261-264.
De Carvalho, L.G., et al., *Synchronizing Web Browsing Data with Browserver,* Computers and Communications ISSCC (2010) pp. 738-743.
Menges, J. et al., *Inverting X: An Architecture for a Shared Distributed Window System,* (Proc., Third Workshop on Enabling Technologies: Infrastructure for Collaborative Enterprises, IEE Computer Society Press, Apr. 1994, pp. 53-64) pp. 1-11.
Peng, C. et al., *Point&Connect: Intention-based Device Pairing for Mobile Phone Users,* MobiSys'09, Jun. 22-25, 2009, Krakow, Poland, pp. 137-149.
Schuckmann, C. et al., *Modeling Collaboration Using Shared Objects,* Group 99, Phoenix, AZ, ACM 1999, pp. 189-198.
Shim, H. S. et al., *Providing Flexible Services for Managing Shared State in Collaborative Systems,* Proceedings of the Fifth European Conference on Computer Supported Cooperative Work, Kluwer Academic Publishers, Netherlands, 1997, pp. 237-252.
*Understanding Home Sharing* [online][retrieved May 9, 2013] Retrieved from the Internet: <URL: http://support.apple.com/kb/HT3819 >.
*iTunes: How to Share Music and Video* [online][retrieved May 9, 2013] Retrieved from the Internet: <URL http://support.apple.com/kb/HT2688 >.
Extended European Search Report for European Application No. 11791986.0 dated Nov. 25, 2014.
Extended European Search Report for European Application No. 12862981.3 dated May 6, 2015.
International Search Report and Written Opinion for International Application No. PCT/FI2013/050198, dated Jun. 6, 2013.
International Search Report and Written Opinion for International Application No. PCT/FI2011/050493, dated Sep. 28, 2011.
Written Opinion for International Application No. PCT/EP2011/074182, dated Feb. 9, 2013.
Written Opinion for International Application No. PCT/US2012/071628, dated Mar. 22, 2012.
Written Opinion for International Application No. PCT/EP2011/074193, dated Sep. 14, 2012.
Written Opinion for International Application No. PCT/EP2011/074178, dated May 22, 2012.
Office Action for U.S. Appl. No. 13/445,467, dated Oct. 17, 2013.
Office Action for U.S. Appl. No. 13/445,467 dated Apr. 17, 2014.
Notice of Allowance for U.S. Appl. No. 13/445,467 dated Nov. 18, 2014.
Bandelloni, R. et al., *Flexible Interface Migration,* Proceedings of the Ninth International Conference on Intelligent User Interfaces (Jan. 2004) 9 pages.
Demeure, A. et al., *The 4C Referemce Model for Distributed User Interfaces,* Proceedings of the Fourth International Conference on Autonomic and Autonomous Systems (Mar. 2008) 61-69.
Luyten, K. et al., *Distributed User Interface Elements to Support Smart Interaction Spaces,* Proceedings of the Seventh IEEE International Symposium on Multimedia (Dec. 2005) 8 pages.
Melchior, J. et al., *A Toolkit for Peer-to-Peer Distributed User Interfaces: Concepts, Implementation, and Applications,* Proceedings of the First ACM Sigchi Symposium on Engineering Interactive Computing Systems (Jul. 2009), 69-78.
*Touch Gesture Reference Guide* [online] [retrieved May 19, 2015]. Retrieved from the Internet: <URL: http://static.lukew.com/TouchGestureGuide.pdf> (Apr. 15, 2010) 7 pages.
Office Action for Japanese Application No. 2014-549372 dated Jan. 25, 2016.
Office Action for Korean Application No. 2014-7021097 dated Jan. 26, 2016.
Office Action for U.S. Appl. No. 13/814,639 dated Apr. 29, 2016.
Office Action for U.S. Appl. No. 14/369,364 dated Feb. 24, 2016.
Office Action for corresponding Chinese Application No. 201180076460.7 dated Mar. 31, 2016.
Office Action for Chinese Application No. 201180028581.4 dated Oct. 28, 2014.
Office Action for Chinese Application No. 201180028581.4 dated Apr. 9, 2015.

(56) References Cited

OTHER PUBLICATIONS

International Search Report and Written Opinion for PCT Application No. PCT/FI2011/050493 dated Sep. 28, 2011.
Office Action for Japanese Application No. 2014-549371 dated Jul. 2, 2015.
Office Action for Japanese Application No. 2014-549372 dated Jul. 17, 2015.
Office Action for U.S. Appl. No. 12/813,248 dated Feb. 7, 2012.
Office Action for U.S. Appl. No. 13/814,639 dated Oct. 10, 2015.
Office Action for U.S. Appl. No. 14/369,364 dated Sep. 8, 2015.
*Accelerating Innovation in the Desktop*, Intel, Retrieved on Jul. 17, 2015, Webpage available at: http://download.intel.com/pressroom/kits/events/computex2009/Crooke_Computex_presentation.pdf.
*ARM11 MPCore™ Processor Technical Reference Manual Revision: r2pO*, ARM DDI 036F (Oct. 15, 2008) 728 pages.
*ARM11MPCore Processor*, ARM, Retrieved on Jul. 17, 2015, Webpage available at: http://www.arm.com/products/processors/classic/arm11/arm11-mpcore.php.
*Category Theory Lecture Notes*, Laboratory for Foundations of Computer Science (Sep. 1996-Dec. 2001) 61 pages.
*Hyper-Threading Technology*, Intel. Retrieved on Jul. 17, 2015, Webpage available at: http://www.intel.com/technology/platform-technology/hyper-threading.index.htm.
*K42*, IBM Research, Retrieved on Jul. 17, 2015, Webpage available at : http://domino.research.ibm.com/comm/research_projects.nsf/pages/k42.lindex.html.
*L4 Developer's Bibliography*, The L4 μ-Kernel Family, Retrieved on Jul. 17, 2015, Webpage available at http://os/inf.tu-dresden.de/L4/bib.html.
*OpenCL—The Open Standard for Parallel Programming of Heterogeneous Systems*, Khronos Group, Retrieved on Jul. 28, 2015, Webpage available at: https:/www.khronos.org/opencl/.
*Recovery-Oriented Computing (ROC) Project*, Berkeley, Retrieved on Jul. 17, 2015, Webpage available at : http://roc.cs.berkeley.edu/.
*Singularity*, Microsoft Research, Retrieved on Jul. 17, 2015, Webpage available at: http://research.microsoft.com/en-us/projects/singularity/.
*The OpenMP® API specification for parallel programming*, OpenMP, Retrieved on Jul. 17, 2015, Webpage available at: http://openmp.org/wp.openmp-specifications/.
*Xen Architecture Overview*, Slideshare, Retrieved on Jul. 28, 2015, Webpage available at: http://www.slideshare.net/nico200567/xen-architecture-q1-2008.
*XenServer*, Citrix, Retrieved on Jul. 17, 2015, Webpage available at: http://www.citrix.com/English/ps2/products/product.asp?contentID=683148.
Bozman et al., *Optimizing Hardware for X86 Server Virtualization*, IDC Analyze the Future (Aug. 2009) 1-18.
Ding et al., *Tracking Rdf Graph Provenance Using Rdf Molecules*, Proceedings of the Fourth International Semantic Web Conference (2005) 2 pages.
Hunt et al., *Singularity: Rethinking the Software Stack*, CAM SIGOPS Operating Systems Review, vol. 41, No. 2 (Apr. 2007) 37-49.
Hwang et al., *Xen on Arm: System Virtualization Using Xen Hypervisor for ARM-based Secure Mobile Phones*, $5_{th}$ IEEE Consumer Communications and Networking Conference (Jan. 10-12, 2008) 257-261.
Jaeger et al., *Flexible Control of Downloaded Executable Content*, ACM Transactions on Information and System Security, vol. 2, No. 2 (May 1999) 177-228.
Milojicic et al., *Process Migration*, Tech Report from HP labs, HPL-1999-21 (Dec. 5, 1998) 49 pages.
Oliver et al., *Personal Semantic Web Through a Space Based Computing Environment*, In Proceedings of Middleware for the Semantic Web, Seconds IEEE International Conference on Semantic Computing (Aug. 4-7, 2008) 14 pages.
Patterson et al., *Recovery Oriented Computing (ROC): Motivation, Definition, Techniques and Case Studies*, Technical Report, UCB/CSD-02-1175 (Mar. 15, 2002) 1-16.
Pham et al., *The Design and and Implementation of a First-Generation Cell Processor*, IEEE International Solid-State Circuits Conference (Feb. 8, 2005) 3 pages.
Rabin *Efficient Dispersal of Information for Security, Load Balancing, and Fault Tolerance*, Journal of the ACM, vol. 36, No. 2 (Apr. 1989) 335-348.
Siberschatz et al., *Interprocess Communication and Remote Procedure Calls*, Operating system concepts, 6th edition (2002) 107-128.
Office Action for corresponding Korean Application No. 10-2014-7021097 dated May 30, 2016.
Notice of Dismissal of Amendment for corresponding Korean Application No. 10-2014-7021097 dated May 30, 2016.
Ramos, G. et al.; "Synchronous Gestures in Multi-Display Environments"; In the Jour. Of Human-Computer Interaction; vol. 24, Issue 1-2; pp. 117-169; Apr. 21, 2009.

\* cited by examiner

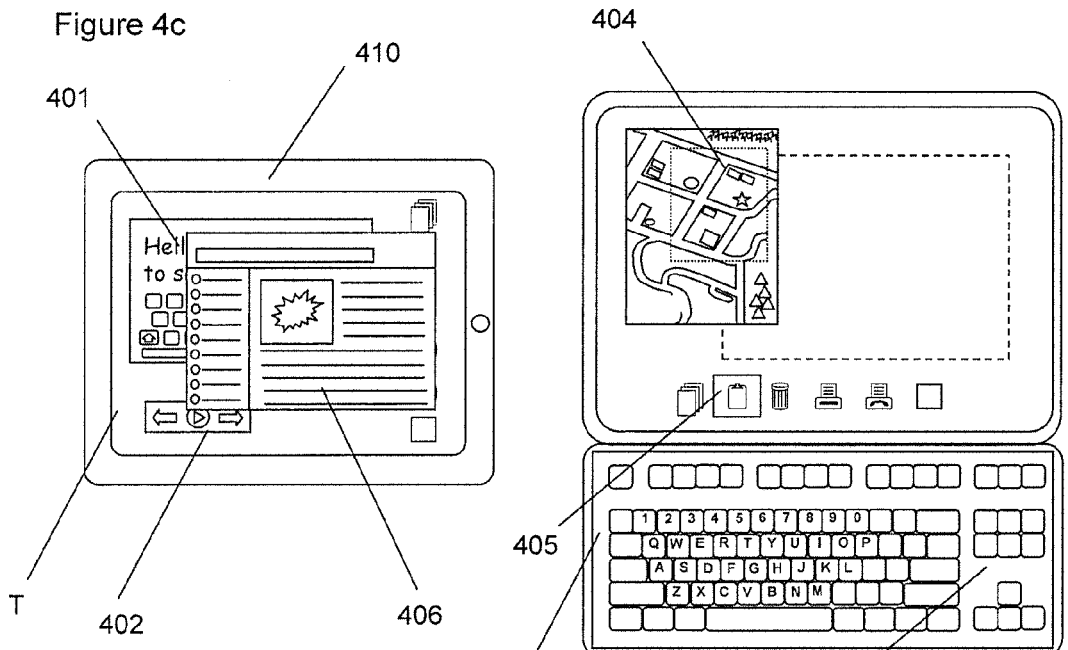
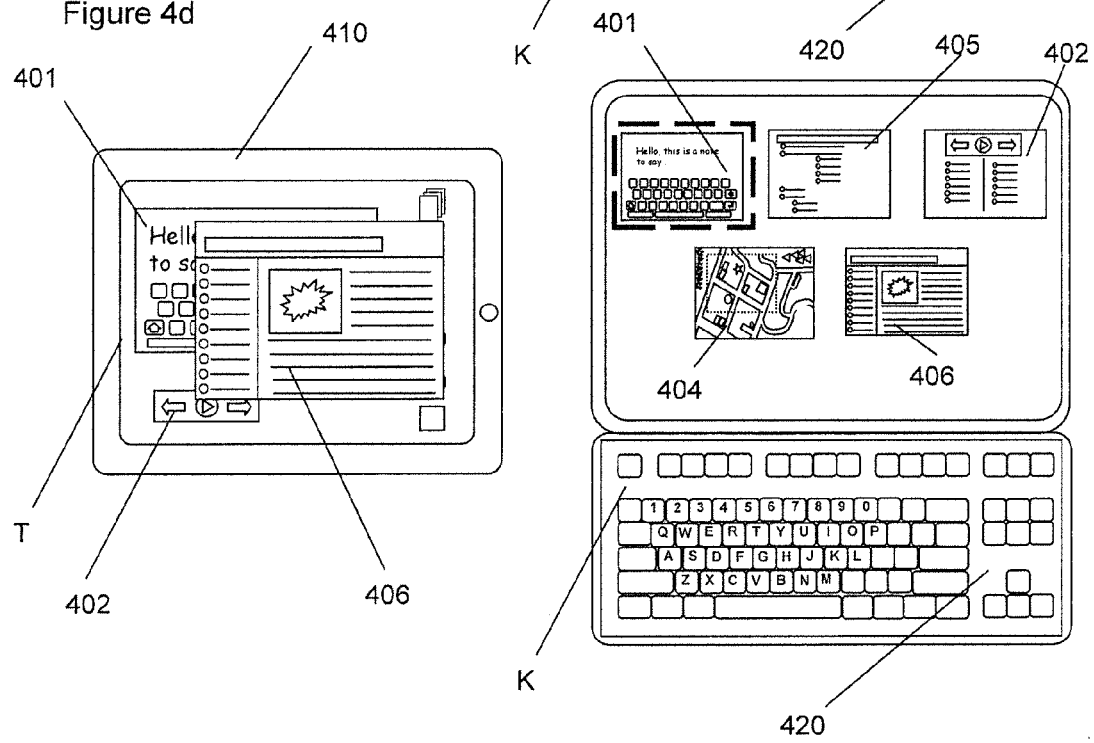

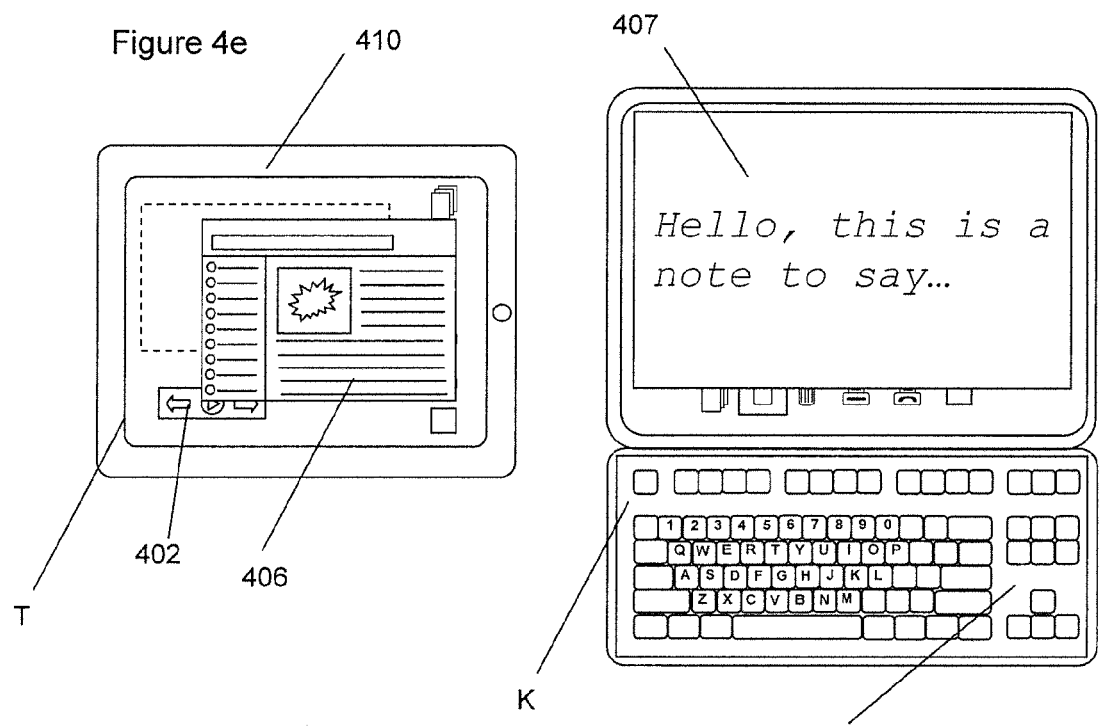
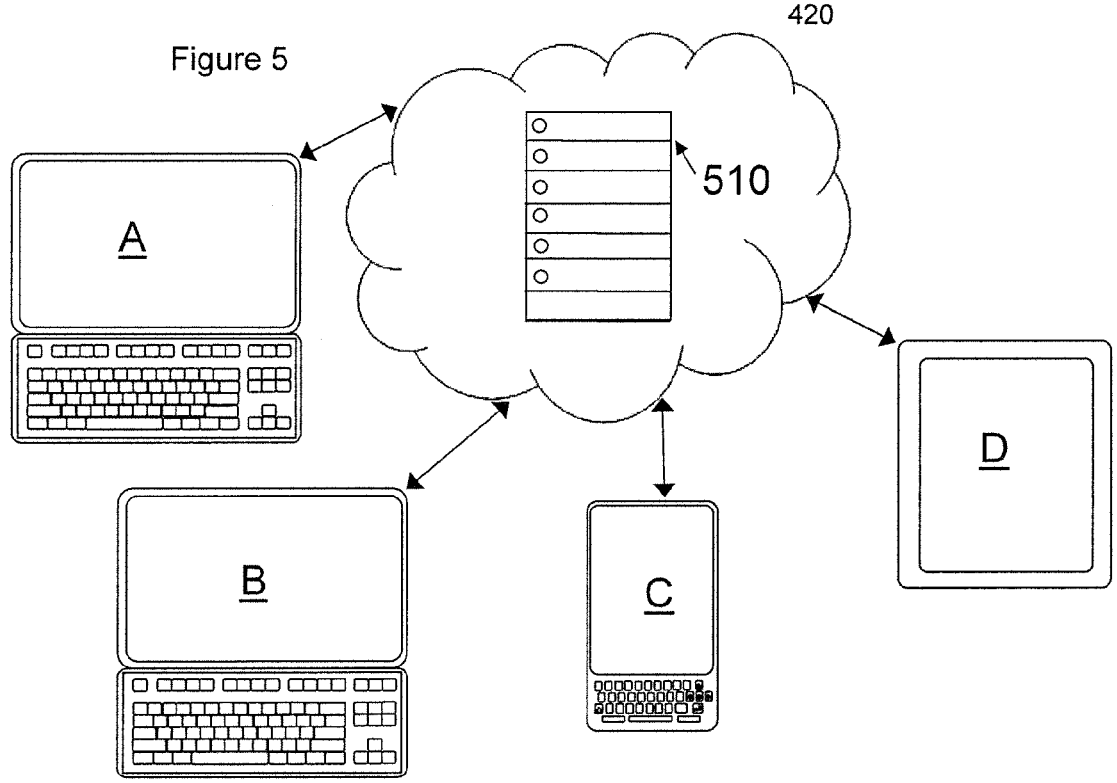

Figure 6

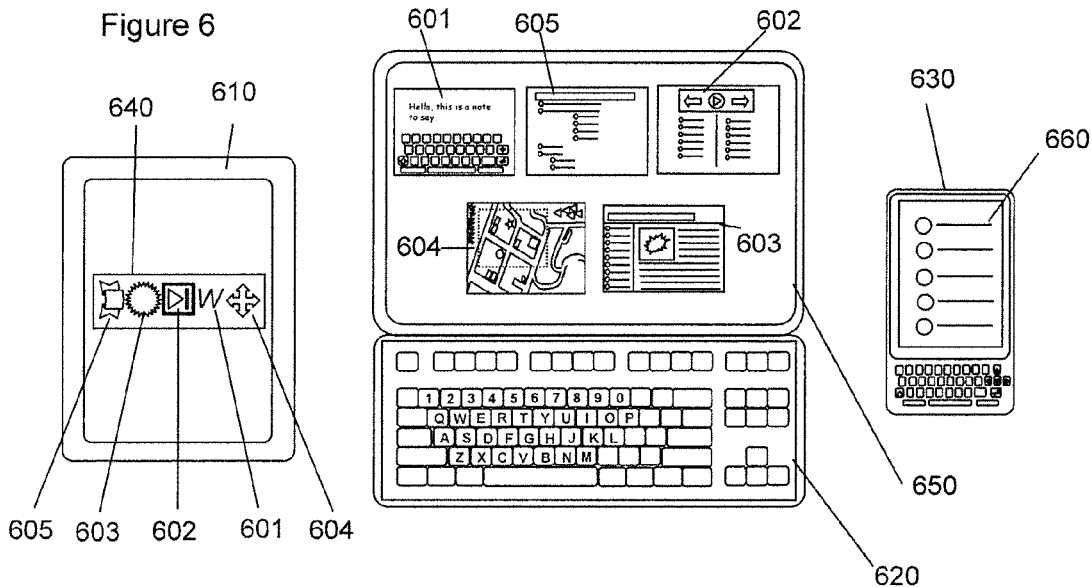

Providing an application switcher to a first device, the application switcher providing an indication of content available to the first device from one or more open applications on a second device, wherein at least part of the content of the one or more open applications of the second device is shareable in real time with an application on the first device — 710

↓ 720

Providing, in response to user-selection of content from the application switcher, the user-selected shareable content of the open application of the second device for use on the first device using a first device application.

Figure 7

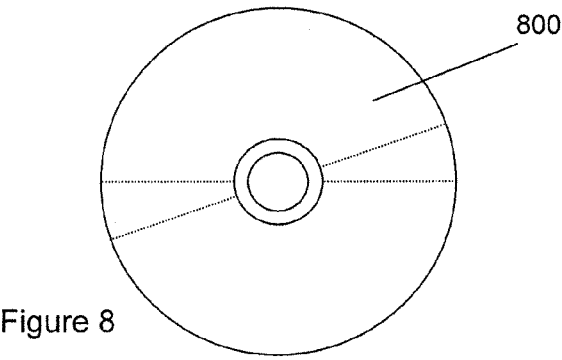

Figure 8

APPLICATION SWITCHER

TECHNICAL FIELD

The present disclosure relates to the field of user interfaces, associated methods, computer programs and apparatus. Certain disclosed aspects/embodiments relate to portable electronic devices, for example so-called hand-portable electronic devices which may be hand-held in use (although they may be placed in a cradle in use). Such hand-portable electronic devices include mobile telephones, so-called Personal Digital Assistants (PDAs) and tablet PCs.

BACKGROUND

There is a function on some computers, for example computers that utilise the Microsoft Windows® operating systems, that is operated by pressing ALT and TAB keys simultaneously which allows users to view an indication of which applications are open and running locally on their machine and to switch between these applications.

The listing or discussion of a prior-published document or any background in this specification should not necessarily be taken as an acknowledgement that the document or background is part of the state of the art or is common general knowledge. One or more aspects/embodiments of the present disclosure may or may not address one or more of the background issues.

SUMMARY

In a first aspect there is provided an apparatus, comprising:
  at least one processor; and
  at least one memory having computer program code stored thereon, the at least one memory and computer program code being configured to, when run on the at least one processor, cause the apparatus to:
  provide an application switcher to a first device, the application switcher providing an indication of content available to the first device from one or more open applications on a second device, wherein at least part of the content of the one or more open applications of the second device is shareable in real time with an application on the first device; and
  provide, in response to user-selection of content from the application switcher, the user-selected shareable content of the open application of the second device for use on the first device using a first device application.

The at least one memory and computer program code may be configured to, when run on the at least one processor, cause the apparatus to:
  in response to user-selection, open a first device application which is a counterpart application to that of the open application on the second device to which the user-selected shareable content relates.

The at least one memory and computer program code may be configured to, when run on the at least one processor, cause the apparatus to:
  in response to user-selection, instruct the second device to exit the open application of the second device to which the user-selected shareable content relates.

The at least one memory and computer program code may be configured to, when run on the at least one processor, cause the apparatus to:
  provide, using the application switcher, an indication of content available to the first device from one or more open applications of a second device when that second device is one or more of:
    paired with the first device, connected to a network/cloud server that the first device is also connected to, and within a predetermined proximity of the first device.

The at least one memory and computer program code may be configured to, when run on the at least one processor, cause the apparatus to:
  provide, using the application switcher, an indication of content available to the first device from one or more open application of the first device itself.

The at least one memory and computer program code may be configured to, when run on the at least one processor, cause the apparatus to:
  provide visual cue(s) as to which indication(s) of content available to the first device are from:
    one or more open applications of the first device itself; and/or
    one or more open applications of the second device.

The at least one memory and computer program code may be configured to, when run on the at least one processor, cause the apparatus to:
  in response to selection of content of an open application on the second device, initiate a counterpart first device application on the first device to which at least part of that user-selected content is shareable.

The at least one memory and computer program code may be configured to, when run on the at least one processor, cause the apparatus to:
  in response to selection of content of an open application on the second device, initiate a default counterpart first device application.

The default setting of the counterpart application may be user-settable or predefined, or both.

The at least one memory and computer program code may be configured to, when run on the at least one processor, cause the apparatus to:
  maintain synchronisation of content between the open application of the second device, to which the user-selected shareable content relates, and the first device application to which the shareable content is provided.

The at least one memory and computer program code may be configured to, when run on the at least one processor, cause the apparatus to:
  configure at least the first device application of the first device in accordance with the user-selected shareable content, wherein the content comprises transient state information associated with the open application of the second device to which the user-selected shareable content relates.

The at least one memory and computer program code may be configured to, when run on the at least one processor, cause the apparatus to:
  allow for sharing of one or more open applications on the first device with the second device, wherein at least part of the content from the first device open applications is shareable in real time with open applications on a second device.

The transient state information (inclusive of operational parameters) may include one or more of:
  unsaved data, window positioning onscreen, cursor positioning onscreen, selection indication onscreen, scroll position onscreen, one or more functional settings, presentational information, temporary settings, user-defined appearance, current instances of temporary data, position of screen, zoom magnification.

The indication of content provided by the application switcher may be provided as graphical representation and/or textual representation.

The at least one memory and computer program code may be configured to, when run on the at least one processor, cause the apparatus to:

provide, using the application switcher, an indication of content available to the first device from respective one or more open applications on a plurality of other devices.

The apparatus may be one or more of:

a portable electronic device, a laptop computer, a mobile phone, a Smartphone, a tablet computer, a personal digital assistant, a digital camera, a watch, a server, the first device and a module/circuitry for one or more of the same.

The apparatus may be one or more of:

a non-portable electronic device, a desktop computer, a monitor, a server, and a module/circuitry for one or more of the same.

In a further aspect there is provided an apparatus, comprising:

means for providing an application switcher to a first device, the application switcher providing an indication of content available to the first device from one or more open applications on a second device, wherein at least part of the content of the one or more open applications of the second device is shareable in real time with an application on the first device; and means for providing content configured to provide, in response to user-selection of content from the application switcher, the user-selected shareable content of the open application of the second device for use on the first device using a first device application.

In a further aspect there is provided a method, comprising:

providing an application switcher to a first device, the application switcher providing an indication of content available to the first device from one or more open applications on a second device, wherein at least part of the content of the one or more open applications of the second device is shareable in real time with an application on the first device; and providing, in response to user-selection of content from the application switcher, the user-selected shareable content of the open application of the second device for use on the first device using a first device application.

In a further aspect there is provided a computer readable medium having computer program code stored thereon, the computer program code being configured to, when run on at least one processor, perform at least the following:

provide an application switcher to a first device, the application switcher providing an indication of content available to the first device from one or more open applications on a second device, wherein at least part of the content of the one or more open applications of the second device is shareable in real time with an application on the first device; and provide, in response to user-selection of content from the application switcher, the user-selected shareable content of the open application of the second device for use on the first device using a first device application.

In a further aspect there is provided a computer program product comprising a computer-readable medium bearing computer program code embodied therein for use with a computer, the computer program code comprising:

code for providing an application switcher to a first device, the application switcher providing an indication of content available to the first device from one or more open applications on a second device, wherein at least part of the content of the one or more open applications of the second device is shareable in real time with an application on the first device; and code for providing, in response to user-selection of content from the application switcher, the user-selected shareable content of the open application of the second device for use on the first device using a first device application.

In a further aspect there is provided a method of assembling an apparatus according to the first aspect.

In a further aspect, there is provided an apparatus, comprising:

at least one processor; and at least one memory having computer program code stored thereon, the at least one memory and computer program code being configured to, when run on the at least one processor, cause the apparatus to:

provide for use by an application switcher of a first device, an indication of content available to the first device from one or more open applications on a second device, wherein at least part of the content of the one or more open applications of the second device is shareable in real time with an application on the first device; and provide, in response to user-selection of content from the application switcher of the first device, the user-selected shareable content of the open application of the second device for use on the first device using a first device application.

The apparatus may be provided in or associated with the second device. The apparatus may be one or more of:

a portable electronic device, a laptop computer, a mobile phone, a Smartphone, a tablet computer, a personal digital assistant, a digital camera, a watch, a server, the second device, and a module/circuitry for one or more of the same.

A system comprising the respective apparatus for use in sharing open applications between the respective first and second devices is also provided.

The present disclosure includes one or more corresponding aspects, embodiments or features in isolation or in various combinations whether or not specifically stated (including claimed) in that combination or in isolation. Corresponding means for performing one or more of the discussed functions are also within the present disclosure.

Corresponding computer programs for implementing one or more of the methods disclosed are also within the present disclosure and encompassed by one or more of the described embodiments.

The above summary is intended to be merely exemplary and non-limiting.

BRIEF DESCRIPTION OF THE FIGURES

A description is now given, by way of example only, with reference to the accompanying drawings, in which:

FIGS. 4*a*-4*e* show an example implementation of an application switcher with a number of features;

FIG. 5 illustrates another example variation;

FIG. 6 illustrates other examples;

FIG. 7 illustrates a flowchart according to an example of a method of the present disclosure; and FIG. 8 illustrates schematically an example of a computer readable medium providing a program.

DESCRIPTION OF EXAMPLE ASPECTS/EMBODIMENTS

Figure 1:
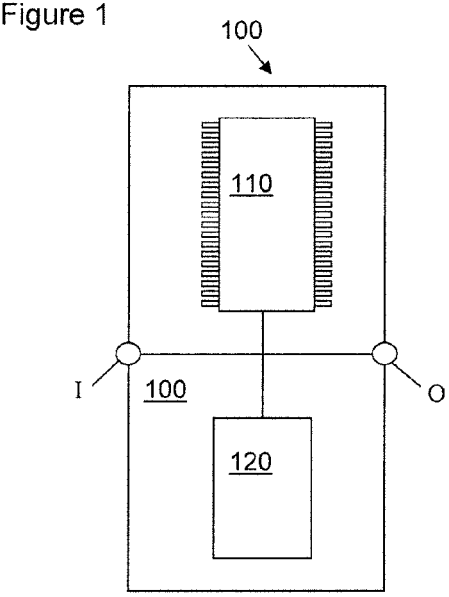
FIG. 1 illustrates an example apparatus according to the present disclosure.

Many consumers own a number of different electronic devices. For example, an average person in the developed world will have their own mobile phone (typically a smart phone), desktop computer, laptop, portable music player, and possibly even a tablet PC. Each of these devices have their own distinct set of functionalities, but each also have some overlap in their functionalities and have some of these functionalities in common.

For example, some portable music players are primarily directed towards playing music files, but are also capable of displaying videos, browsing a wireless network, editing documents, and recording audio clips. At the same time, a work computer is typically equipped to perform in a specialised manner for the job at hand (e.g. word processing for secretaries, photo editing for graphic designers, audio mastering for sound engineers, etc.), but they are also capable of displaying videos, browsing a wireless network, editing documents, and recording audio clips. Please note this list is not exhaustive and merely gives examples.

Because of the multi-functionality of devices, users often utilise multiple devices at once. For example, a user at home may choose to simultaneously browse the internet on their laptop, have a word document open on their desktop computer, listen to music on their portable music player, and have their phone on standby on the desk beside them.

In any application running (and thus open) on any given device, there is a lot of information that is made available to that application. Some of that information can be considered to be "persistent", and some of it can be considered "transient". We can refer to the application as having a "persistent" state and a "transient state". "Persistent" and "transient" states are known terms in the art.

The persistent state can be thought of as the state that ordinarily persists between open instances of an application. The persistent state represents data that is saved and can be viewed whenever the application is opened. In contrast, the transient state is the data that will not ordinarily persist between instances of an application (unless saved for a recovery file for use following a critical failure of the running application).

For example, two users might each use different programs on their own devices to open and edit a spreadsheet document. Some of the information, like the size of the spreadsheet and the contents of each cell, are necessarily persistent and will be stored when one application (or instance of an application) is closed and recovered when another application (or another instance of the same application) is opened. Such information is persistent and saved by each application so that that information can be recalled next time the spreadsheet is opened. Whenever an application has the spreadsheet open there is a lot of information that won't be saved, such as the current extent of the view of the spreadsheet, the portion of the document that is currently selected, the magnification of the view, the location of the user's cursor, the cell currently being edited, the location of a text caret, etc, when the application is actually closed. Such information makes up the transient state and would not normally be saved by a given application.

If the user of a first application on a first device is currently editing a spreadsheet and wishes to switch to using a second user's device with a second application (or an alternative instance of the same application), then in the past the first user would need to save and close the spreadsheet on his device before re-opening it from the other device in order to avoid duplicate open instances of the same application and the potential for collision that this entails. In doing so, the user loses all the transient information associated with the spreadsheet and the application that he was using.

However, if one or more parts of the transient state information are shared between the two devices and between the two applications, then the second application can be configured using the transient information from the first device so that those parts of the transient state of the first application can be recreated in the second application. Where parts of the transient state information are shared, the corresponding elements of the user experience in the second application can be made equivalent to the first application. The transition between the first and second applications is therefore much smoother for the user as much of the context of the first application can be maintained in the second application. It also saves the user a lot of time configuring the second editor in order to approximate the state in which the first editor was before the transition.

The two applications could be different programs and/or running on completely different devices (potentially with different operating systems) and the programs' user interfaces might look very different—especially if the devices have a different form factor (e.g. mobile phone vs. laptop). However, so long as both applications have been configured to share the transient state information in this way, then such information can be moved between the applications to provide the benefits described above. Such configuration may be included at the time when the applications are first written, or the programs may be modified after production in order to add this functionality.

Examples will now be explained with reference to different applications running on separate devices. However, it is to be understood that the same principals can be applied to different instances of the same application that are running on separate devices, or to different applications or different instances of the same application that are running on a single device.

To achieve synchronisation between the applications, the transient state needs to be shared (e.g. synchronised, or at least communicated) between them. There are many ways in which this can be done. In one example, this is achieved by replicating the transient state information locally at each device. The transient state information can be shared between devices when required (e.g. upon prompting, upon detection of a change in it, recruited as part of an application like an application switcher, or the like).

As stated in the background section above, Microsoft Windows® computers have a function accessible by simultaneously pressing the ALT and TAB keys that allows for toggling between open applications on that computer and allows for an indication as to which applications are open on that device. However, this does not permit viewing of which (shareable) applications are running on other devices, and also does not permit a user to switch to share content of an open application of one device to another device. For example, even though a laptop is capable of playing music files, if a user is listening to music using an application, then that functionality cannot normally be directly transferred to the laptop: the user of the laptop cannot toggle to the music player's application (or a local equivalent of it) simply because that application is open on the music player device.

In some cases, it would be advantageous to be able to share content of open applications across multiple devices in real time between those devices using an application switcher (any function that allows the user to switch between applications, for example currently running/open applications). For example, it would be useful for a user of a first device (e.g. a laptop) to be able to be provided with an indication of content available to that first device from one or more open applications on a second device (a music player application on a portable music player). It would be necessary for at least part of the content of that open application of the second device to be shareable e.g. in real time with at least one application on the first device (e.g. a music player application).

If a user selects content from a suitably configured application switcher, the user-selected shareable content of the open application of the second device could be provided for use on the first device using a first device application (e.g. as per the examples above). Various embodiments that provide such features are described below.

We will now describe a first example as per FIG. 1 which shows an apparatus 100 comprising a processor 110, memory 120, input I and output O. In this embodiment only one processor and one memory are shown but it will be appreciated that other embodiments may utilise more than one processor and/or more than one memory (e.g. same or different processor/memory types). The apparatus 100 may be an application specific integrated circuit (ASIC) for a portable electronic device. The apparatus 100 may also be a module for a device, or may be the device itself, wherein the processor 110 is a general purpose CPU and the memory 120 is general purpose memory.

The input I allows for receipt of signalling to the apparatus 100 from further components. The output O allows for onward provision of signalling from the apparatus 100 to further components. In this embodiment the input I and output O are part of a connection bus that allows for connection of the apparatus 100 to further components. The processor 110 is a general purpose processor dedicated to executing/processing information received via the input I in accordance with instructions stored in the form of computer program code on the memory 120. The output signalling generated by such operations from the processor 110 is provided onwards to further components via the output O.

The memory 120 (not necessarily a single memory unit) is a computer readable medium (such as solid state memory, a hard drive, ROM, RAM, Flash or other memory) that stores computer program code. This computer program code stores instructions that are executable by the processor 110, when the program code is run on the processor 110. The internal connections between the memory 120 and the processor 110 can be understood to provide active coupling between the processor 110 and the memory 120 to allow the processor 110 to access the computer program code stored on the memory 120.

In this embodiment the input I, output O, processor 110 and memory 120 are electrically connected internally to allow for communication between the respective components I, O, 110, 120, which in this example are located proximate to one another as an ASIC. In this way the components I, O, 110, 120 may be integrated in a single chip/circuit for installation in an electronic device. In other embodiments, one or more or all of the components may be located separately (for example, throughout a portable electronic device such as devices 200, 300, or within a network such as a "cloud"—see FIG. 5—and/or may provide/support other functionality.

Figure 2:
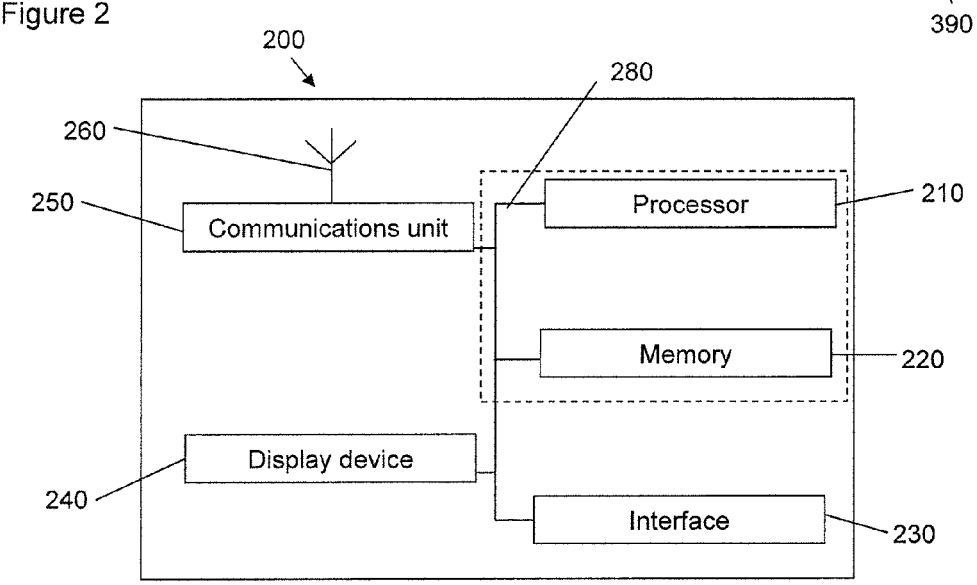
FIG. 2 illustrates another example.

One or more examples of the apparatus 100 can be used as a component for another apparatus as in FIG. 2, which shows a variation of apparatus 100 incorporating the functionality of apparatus 100 over separate components. In other examples the device 200 may comprise apparatus 100 as a module (shown by the optional dashed line box) for a mobile phone or PDA or audio/video player or the like. Such a module, apparatus or device may just comprise a suitably configured memory and processor.

The example apparatus/device 200 comprises a display 240 such as, a Liquid Crystal Display (LCD), e-Ink, or touch-screen user interface (like a tablet PC). The device 200 is configured such that it may receive, include, and/or otherwise access data. For example, device 200 comprises a communications unit 250 (such as a receiver, transmitter, and/or transceiver), in communication with an antenna 260 for connection to a wireless network and/or a port (not shown). Device 200 comprises a memory 220 for storing data, which may be received via antenna 260 or user interface 230. The processor 210 may receive data from the user interface 230, from the memory 220, or from the communication unit 250. Data may be output to a user of device 200 via the display device 240, and/or any other output devices provided with apparatus. The processor 210 may also store the data for later user in the memory 220. The device contains components connected via communications bus 280.

The communications unit 250 can be, for example, a receiver, transmitter, and/or transceiver, that is in communication with an antenna 260 for connecting to a wireless network and/or a port (not shown) for accepting a physical connection to a network, such that data may be received via one or more types of network. The communications (or data) bus 280 may provide active coupling between the processor 210 and the memory (or storage medium) 220 to allow the processor 210 to access the computer program code stored on the memory 220.

The memory 220 comprises computer program code in the same way as the memory 120 of apparatus 100, but may also comprise other data. The processor 210 may receive data from the user interface 230, from the memory 220, or from the communication unit 250. Regardless of the origin of the data, these data may be outputted to a user of device 200 via the display device 240, and/or any other output devices provided with apparatus. The processor 210 may also store the data for later user in the memory 220.

Figure 3:
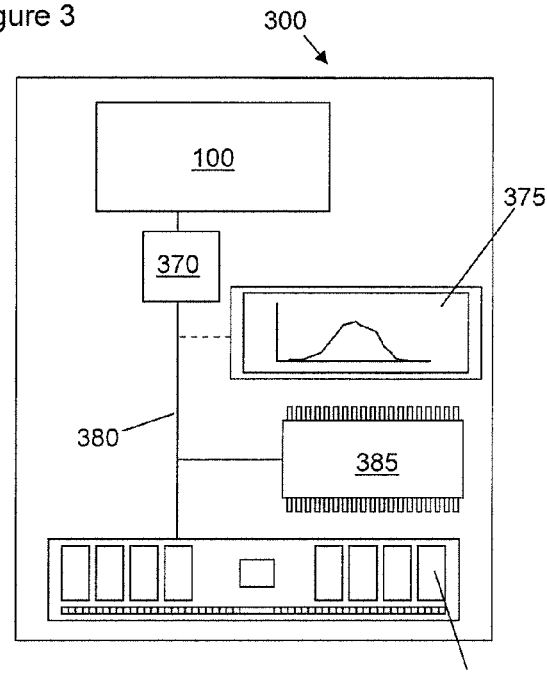
FIG. 3 illustrates another example.

The device/apparatus 300 shown in FIG. 3 may be an electronic device (including a tablet PC or a desktop computer), a portable electronic device, a portable telecommunications device, or a module for such a device. The apparatus 100 can be provided as a module for device 300, or even as a processor/memory for the device 300 or a processor/memory for a module for such a device 300. The device 300 comprises a processor 385 and a storage medium 390, which are electrically connected by a data bus 380. This data bus 380 can provide an active coupling between the processor 385 and the storage medium 390 to allow the processor 380 to access the computer program code.

The apparatus 100 in FIG. 3 is electrically connected to an input/output interface 370 that receives the output from the apparatus 100 and transmits this to the device 300 via data bus 380. Interface 370 can be connected via the data bus 380 to a display 375 (touch-sensitive or otherwise) that provides information from the apparatus 100 to a user. Display 375 can be part of the device 300 or can be separate. The device 300 also comprises a processor 385 that is configured for general control of the apparatus 100 as well as the device 300 by providing signalling to, and receiving signalling from, other device components to manage their operation.

The storage medium 390 is configured to store computer code configured to perform, control or enable the operation of the apparatus 100. The storage medium 390 may be configured to store settings for the other device components. The processor 385 may access the storage medium 390 to retrieve the component settings in order to manage the operation of the other device components. The storage medium 390 may be a temporary storage medium such as a volatile random access memory. The storage medium 390 may also be a permanent storage medium such as a hard disk drive, a flash memory, or a non-volatile random access memory. The storage medium 390 could be composed of different combinations of the same or different memory types. The various examples described below can be implemented as any of apparatus 100, apparatus/device 200 and apparatus/device 300 depending on the technical goal desired. We will describe a first implementation now with reference to FIGS. 4a-4e.

Figure 4A:
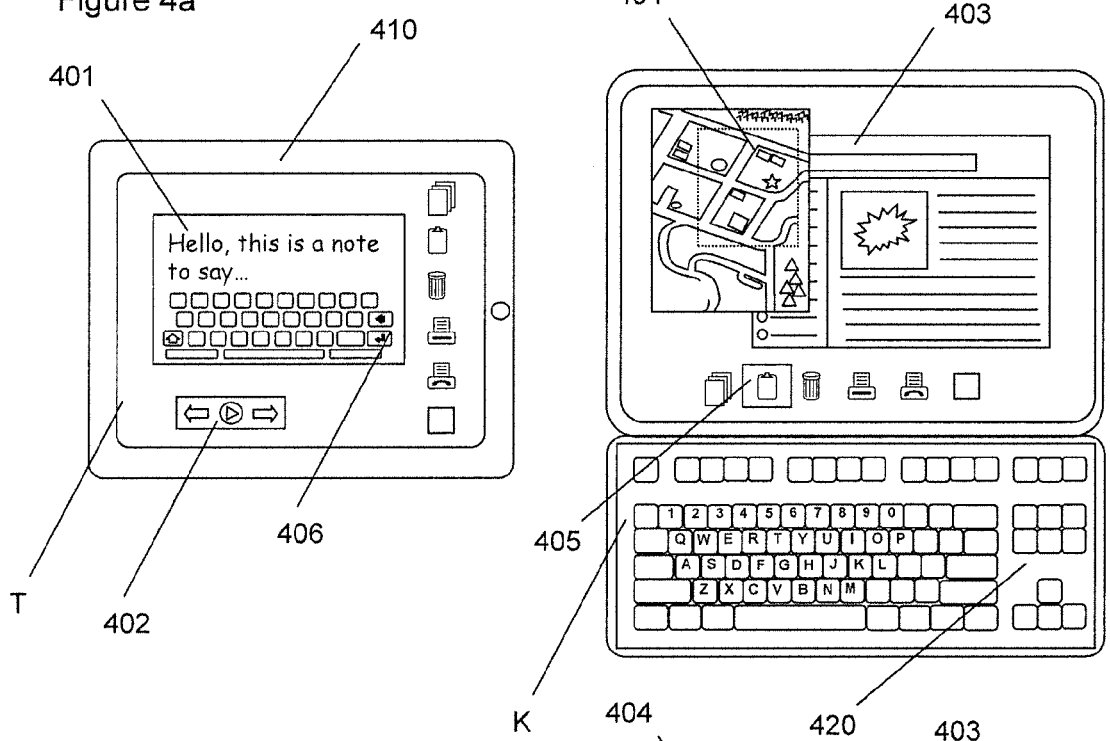

FIG. 4a illustrates a first device, which is a tablet PC 410, and a second device, which is a desktop computer 420. The desktop computer 420 comprises the apparatus 100 as a module like that shown in FIG. 3, while the tablet PC 410 comprises the functionality of apparatus 100 spread throughout software and hardware components as per the illustration of FIG. 2. Both the tablet PC 410 and desktop computer 420 comprise their own processors, memory/memories, input/output interfaces (tablet PC 410 has touch-screen display T and the desktop computer 420 has its own physical keyboard K) and the like to allow those devices to operate as per standard tablet PCs and desktop computers. This allows a user to run multiple applications on each device independently. The example(s) shown in the figures are only examples and many device/apparatus can be provided or configured in accordance with the present disclosure, and such devices/apparatus can take the form of a portable electronic device, a laptop computer, a mobile phone, a Smartphone, a tablet computer, a personal digital assistant, a digital camera, a watch, a non-portable electronic device, a desktop computer, a monitor, a server, or a module/circuitry for one or more of the same. Similarly, it is not necessarily the case that each device/apparatus has every one of the features described in respect of the inventions—a device may not comprise a display, for example, but may use an external display or some other means of providing output to a user (e.g. an audio output).

FIG. 4a shows that the tablet PC 410 is presently running a word processing application 401 and a music player application 402. FIG. 4a also shows that the desktop computer is running a web browser application 403, a map application 404 and a notepad application 405 which is running in the background (as indicated by the highlighted notepad icon). So the tablet PC 410 is running two applications 401, 402 while the desktop computer is running three applications, 403, 404, 405.

In this example, the tablet PC 410 and desktop computer 420 are able to wirelessly communicate directly with one another via an ad hoc wireless network (e.g. WiFi, 802.11a/b/g/n, Bluetooth, etc), though in other examples communication between the devices 410, 420 may be via paired communication, achieved via a cloud network/server (see FIG. 5), or in using any other suitable direct or indirect (via another device) approach.

Figure 4B:
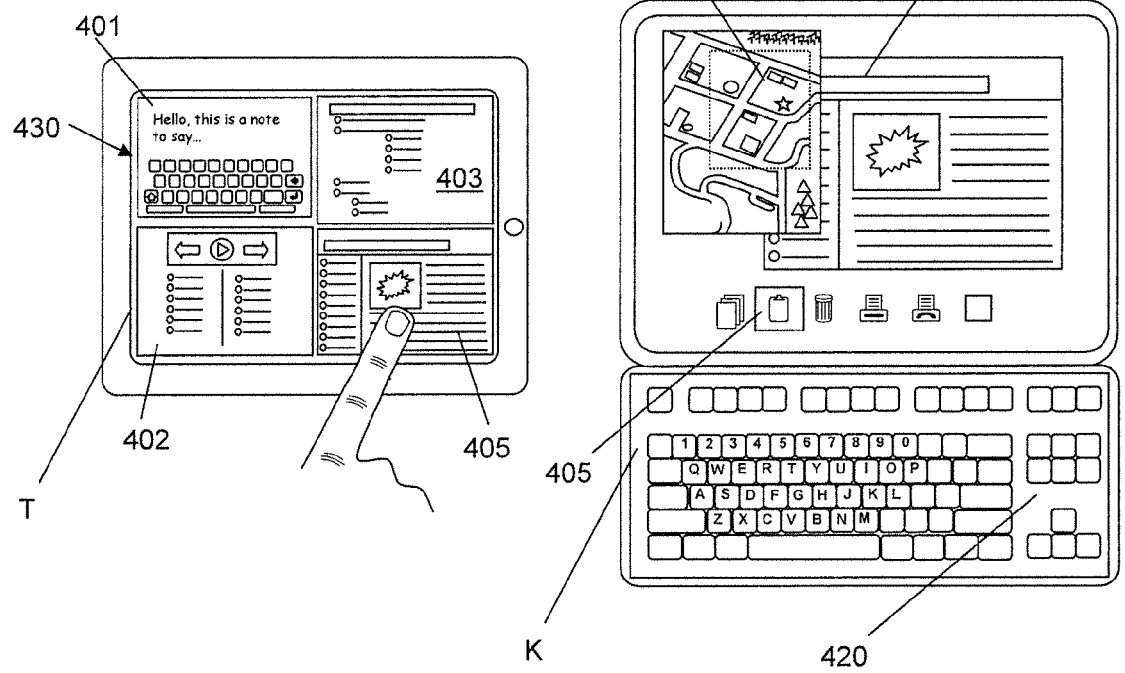

FIG. 4b shows that a user has initiated an application switcher 430 on the tablet PC 410. This application switcher 430 provides an indication of content available to the first tablet PC device 410 from one or more open applications on the second desktop computer device 420. In this example, the application switcher 430 also provides indication of content available to the first tablet PC device 410 that is provided by open applications on the tablet PC 410 itself, much like a collated/aggregated list of possible applications that the user can access, though this need not necessarily be the case. The application switcher 430 appears, in this example, in the form of resized representations of the windows of each of the applications (401, 402, 403, 405).

It should be noted that the open applications of the second desktop computer device 420 that are provided via the application switcher 430 are only those where at least part of the content of the one or more open applications of the second device is shareable in real time with an application on the first device. In this example, there is no counterpart application on the tablet PC 410 that allows for sharing of any of the content of the map application 404 on the desktop computer. As a result, there is no purpose in providing indications of this content to a user of the tablet PC 410 as they will not be able to access or share that information. In contrast, both the tablet PC 410 and the desktop computer 420 have applications that are counterparts to one another that are functionally useable for web browsing, music playing, word processing, and note taking. As such, although there are a total of five applications 401-405 running across the two devices 410, 420, only four of those applications 401-403, 405 are shareable/accessible to that first tablet PC device 410, and therefore only those four are provided as an indication of shareable content.

FIG. 4b shows that, via the touch-screen of the tablet PC 410, the user can select any of those open applications to access the sharable content indicated via the application switcher 430. In this example, the user has selected the web browser application 403 running on the desktop computer 420. The user-selection may take the form of user inputs (on the tablet PC 410 touch-screen interface) via gestures. Such gestures can comprise one or more of a tap, a swipe, a slide, a press, a hold, a rotate gesture, a static hover gesture proximal to the user interface of the device, a moving hover gesture proximal to the device, bending at least part of the device, squeezing at least part of the device, a multi-finger gesture, tilting the device, or flipping the device. Alternatively or additionally, any other suitable gesture(s) may be used, In response to the selection of the web browser, content to which that web browser application 403 relates is wirelessly communicated (in this example) from the desktop computer 420 directly to the tablet PC 410 so that a counterpart application—web browser 406, which may or may not be the same application as web browser 403—can replicate that content (to some extent) on the tablet PC 410.

An effect of this is that if a user was viewing a particular webpage, e.g. BBC News website, then by selecting that indication of sharable content provided on the tablet PC 410 via the application switcher, the counterpart web browser application 406 would be initiated on the tablet PC 410 and the same website address could be opened. Sharable content is a broad term which, in the context of a web browsing application, may include text, images, movies and audio content present in a website which are accessible to a user upon accessing the website, the functionality provided by the website and by the website browsing application, and any icon or graphical representation of the web browsing application. Also, the indication of content provided by the application switcher could be an icon associated with the application, or actually be part of all of the sharable content being indicated.

In addition to this, in this particular example, transient state information relating to that content and/or the browser application (e.g. zoom magnification, volume settings, scroll position on the page, browsing history, cache/cookies, passwords, security settings, etc) that is not necessarily stored by the application as part of a web address (but are, for example, utilised in a transient state as part of operational parameters of the open application as running on the second desktop computer device 420) can be communicated to the tablet PC 410 and used to replicate the transient state of the web browser application 403 as it was running on the desktop computer 420. This means that the way the user was using and interacting with the web browser application 403 on the desktop computer 420 can be ported over to the tablet PC 410 to create the user-perception that a single instance of the web browser application 403 has now been moved (or duplicated) from the second device 420 to the first device 410.

The transient state information (inclusive of operational parameters) can include any one or more of the following: unsaved data (e.g. between formal saves of an application by a user), window positioning onscreen, cursor positioning onscreen, selection indication onscreen, scroll position onscreen, one or more functional settings (e.g. volume setting), presentational information, temporary settings, user-defined appearance, current instances of temporary data, position of screen, zoom magnification, and the like.

This is not an exhaustive list but contains examples that explain the nature of transient state information and associated operational parameters, as well as the nature of the sharable content that can be provided from one device 420 to another 410 by way of this application switcher 430. It should be noted that certain content may be provided and useable by a particular device, but need not necessarily be used when provided from one device to another. This is discussed in more detail below.

In effect, the application switcher 430 may provide, in response to user-selection of content from the application switcher 430, the user-selected shareable content of the open application (403 in this case) of the second device 420 for use on the first device 410 using a first device application (406 in this case).

Of course, the user could instead select an open application already running on the first tablet PC device 410 from the application switcher and a standard opening of that application would be performed. The point here is to be able to provide (at least) an indication of content available to the first tablet PC device 410 from one or more open applications on the second desktop computer device 420. There can be provided some visual cue/cues that a given indication of content belongs to a particular device, e.g. device names/numbers in the top-left corner of each indication of shareable content to show which content is shareable from a local device or remote device, or colours, shapes or some form of highlighting could be used.

In this example, once the shareable content has been provided to the tablet PC 410, the tablet PC 410 instructs the desktop computer to exit the open browser application 403 to complete the user-perception that the web browser application 403 has moved to the tablet PC 410 (as web browser application 406). This is shown in FIG. 4c which illustrates how the web browser application 406 has been initiated in real time and content from the web browser application 403 of the desktop computer 420 has been provided to that browser 406 on the tablet PC 410.

It will be appreciated that there might be more than one web browser application on a given device (e.g. Microsoft Internet Explorer®, Mozilla Firefox®, Apple Safari®, Opera®, etc). In this case there is a default application setting that sets the default application to be used when initiating the first device application for viewing the user-selected shareable content. This can be predefined and/or user-defined, or the user could even be asked which application they wish to use for given content.

This technique enables applications and their shareable content to be swapped between devices. In reality, a particular application itself is not really 'swapped' from a particular device, but instead an equivalent or at least corresponding counterpart application with some functionality/functionalities in common is opened at the other device and configured to provide continuity (based on the shared content) from the application that the user had previously been using. This gives the user-perception that a single application appears to have seamlessly swapped from one device to the other.

The above discussion sets out a simple initial example where a first device has access to a second device's applications. Of course, this scenario can be expanded to incorporate the possibility of multiple devices that are capable of sharing in each other's content.

FIG. 4d illustrates that the desktop computer 420 can also be provided with its own application switcher 440 that performs in substantially the same way as the application switcher 430 of the tablet PC 420. In this application switcher 440, the open applications running on the two devices 410, 420 are all shareable and accessible to some extent by the desktop computer 420, unlike the previous example where the tablet PC 410 which could not share in any of the content of map application 404 (such content may include the images of the maps themselves, and any functionality associated with the maps (such as the ability to place markers on the maps for the start and end of a journey, or the ability to set route preferences such as avoiding toll roads, for example). As a result, all five running applications 401-405 are illustrated by the application switcher 440 for user-selection.

In this continued example, the user selects the word processing application 401 for the provision of whatever shareable content is available for the second device 420 from that application 401. Sharable content relating to a word processing application may include any text and figures in a document including formatting, any functionality associated with the word processing application (such as, for example, allowing a user to change font settings, margins, or page layouts), menu structures within the application and any icons used to indicate the application, for example, in a list or on a desktop. This list is not exhaustive. As a result, the desktop computer 420 can choose to initiate its own word processing application or it can use an alternative application, such as the note pad application 405 that is currently running in the background of the desktop computer 420.

Because there is the possibility of more than one application being useable for the shareable content of the word processing application 401 of the tablet PC 410, there is the need for an appropriate counterpart application to be established. In this case, a default setting is that the application that will use the least processing power should be initiated. Given that the note pad application 405 is already running, a new window 407 of the note pad application 405 is initiated rather than initiating a word processing application or dedicated data processing package. In other examples, the user may be prompted to choose an application to be initiated, and in other examples there may be a predefined and/or user-defined default application for particular content.

Like in the examples of FIGS. 4a-4c, initiation of this counterpart application causes the desktop computer 420 to instruct the tablet PC 410 to exit the word processing application 401 so as to create a seamless transition from use of the application 401 on the first device 410 to the counterpart application 407 on the second device 420. It should be noted that the font type, font setting, and zoom setting is different for this note pad application 407 compared to the word processing application 401 that was running on the first device 420. This is to illustrate that although the word content and its general format that was entered in the word processing application 401 has been provided to the second device 420, not all content need be provided and/or used by the second device 420. At least part of the shareable content is shared, but not all need be shared/used. The second device 420 may choose to ignore certain content or operational parameters (e.g. font size, scroll position, etc) depending on the nature of the content being received or certain predefined/user-defined settings.

Because the tablet PC 410 only has a touch-screen for typing characters into its word processing application 401, a touch-screen keyboard may to be provided as part of the application 401. However, with the desktop computer 420 a hardware keyboard is provided, and there is no touch-screen, as such there is no keyboard presented onscreen and the hardware keyboard is used instead. Such variations may occur when content is shared between different devices and different applications depending on the content.

If the user had selected the music player application 402 of the table PC 410, then the desktop computer 420 would have initiated its own music player application which might be very different to that of music player application 402. However this would not matter as the audio that forms shareable content, and the transient state content could be the audio was being played (e.g. how many seconds/minutes into the audio clip, volume and/or equaliser settings, etc) can be ported over, though not necessarily used, in the counterpart music player application.

From comparing FIG. 4a to FIG. 4e it can be seen that a number of open applications have been 'swapped' between devices 410, 420. Where some applications where running on the desktop computer 420 counterpart applications have taken over that operation on the tablet PC 410, and vice versa. This allows for easy sharing of content in an intuitive and accessible way between devices, even when those devices may operate on different operating systems (e.g. Microsoft Windows®, Linux®, Apple Mac OS X®, Apple iOS®, BlackBerry OS®, Symbian OS®, etc.) or have different types of counterpart application. This allows for seamless real time sharing of content between such applications on devices with different or identical operating systems.

The 'other devices' to which a given device (in accordance with one or more examples given above) can be set up for sharing content across applications in different ways. For example, other devices within a particular range of a first device can be set up to share content as part of the application switcher (e.g. based on proximity), the other devices could be registered by pairing together in some way, or the collective devices could all be part of the same "real-time sharing" network, or the like.

In the examples described above, when an application is 'swapped', the original open application is exited to complete the seamless transition (i.e. can be likened to 'stealing' an application). It will of course be appreciated that this need not be the case, and that, once a corresponding first device application has been opened the original open application on the other device could remain active. In such an example, the original open application would remain open at the first device, and the two (or more open) applications (one on each device) would be maintained in synchronisation with each other (i.e. they both/all run together). In some implementations they might remain interdependent, e.g. so a change in one results in the same change in the other via reciprocal sharing of content between the devices, or they might operate independently of one another, e.g. neither application affects the other once the original content has been shared.

While the examples illustrated in FIGS. 4a-4e operate by way of direct communication between tablet PC 410 and desktop computer 420, it will be appreciated that indirect communication is possible to achieve this same end. FIG. 5 illustrates how cloud computing/network servers (collectively labelled 510, and which can be any combination or virtual, physical, local, or remote servers) and the like can allow for enhanced sharing of content between multiple devices (A-D) and not necessarily restricted to just two devices. For example, source code for applications could be stored on the cloud servers and respective devices can utilise that code for running one or more of their own applications. At the very least, some element of a given application must be running on a given device.

It will be appreciated that there is an appropriate mechanism in place for providing an indication of the sharable content from one/second device to the application switcher of a first device which is being used to select an open application to use from the second device. Thus, the second device must provide an indication of what content is shareable and allow for sharing of that content with the first device.

FIG. 6 illustrates how application switchers 640, 650, 660 can be provided across three devices 610, 620, 630 to allow a user to access different applications on different devices. It will be appreciated that each application need not be exited if a counterpart application is opened on another device, and it will be appreciated that application switcher may indicate open applications whose content is at least partly shareable graphically and/or textually. For example, application switcher 640 of device 610 appears as a set of graphical icons each representing the shareable content applications open across all three devices. Application switcher 650 of device 620 provides a shrunken representation of each of the windows of each application running across the three devices. Application switcher 660 of device 630 provides a text-based list of the application running across the three devices. Each item in the list can be selected as an indication of shareable content, and can then be provided to the respective device.

The order in which the indications appear may reflect the order of usage of applications across all three devices 610, 620, 630, or may be based on which open applications on remote devices (e.g. 620, 630) have already running counterparts on a local device in question (e.g. 610).

FIG. 7 shows a flow diagram illustrating:
710—providing an application switcher to a first device, the application switcher providing an indication of content available to the first device from one or more open applications on a second device, wherein at least part of the content of the one or more open applications of the second device is shareable in real time with an application on the first device; and 720—providing, in response to user-selection of content from the application switcher, the user-selected shareable content of the open application of the second device for use on the first device using a first device application.

FIG. 8 illustrates schematically a computer/processor readable medium 800 providing a program according to an embodiment. In this example, the computer/processor readable medium is a disc such as a digital versatile disc (DVD) or a compact disc (CD). In other embodiments, the computer readable medium may be any medium that has been programmed in such a way as to carry out an inventive function. The computer program code may be distributed between the multiple memories of the same type, or multiple memories of a different type, such as ROM, RAM, flash, hard disk, solid state, etc.

The portable electronic devices/apparatus according to one or more disclosed aspects/embodiments may provide one or more audio/text/video communication functions (e.g. tele-communication, video-communication, and/or text transmission (Short Message Service (SMS)/Multimedia Message Service (MMS)/emailing) functions), interactive/non-interactive viewing functions (e.g. web-browsing, navigation, TV/program viewing functions), music recording/playing functions (e.g. MP3 or other format and/or (FM/AM) radio broadcast recording/playing), downloading/sending of data functions, image capture function (e.g. using a (e.g. in-built) digital camera), and gaming functions.

Any mentioned apparatus/device/server and/or other features of particular mentioned apparatus/device/server may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some embodiments, a particular mentioned apparatus/device/server may be pre-programmed with the appropriate software to carry out desired operations, and wherein the appropriate software can be enabled for use by a user downloading a "key", for example, to unlock/enable the software and its associated functionality. Advantages associated with such embodiments can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some embodiments one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/embodiments may consist of any such individual feature or combination of features. In view of the foregoing description it will be evident to a person skilled in the art that various modifications may be made within the scope of the disclosure.

While there have been shown and described and pointed out fundamental novel features as applied to preferred embodiments thereof, it will be understood that various omissions and substitutions and changes in the form and details of the devices and methods described may be made by those skilled in the art without departing from the spirit of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or embodiments may be incorporated in any other disclosed or described or suggested form or embodiment as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus, comprising:
   at least one processor; and
   at least one memory having computer program code stored thereon, the at least one memory and computer program code being configured to, when run on the at least one processor, cause the apparatus to:

provide an application switcher to a first device, the application switcher providing an indication of content available to the first device from one or more open applications on a second device, wherein at least part of the content of the one or more open applications of the second device is shareable in real time with an application on the first device, and wherein the application switcher provides an indication of content available to the first device that is provided by open applications on the first device in addition to the provision of the indication of content available to the first device that is provided by open applications on the second device to thereby provide an aggregated list of possible applications for access;

provide, in response to user-selection of content from the application switcher, the user-selected shareable content of the open application of the second device for use on the first device using a first device application; and configure at least the first device application of the first device in accordance with the user-selected shareable content, wherein the content comprises transient state information associated with the open application of the second device to which the user-selected shareable content relates, such that the first device application is configured using the transient state information which includes one or more of window positioning onscreen, selection indication onscreen, scroll position onscreen, volume settings, presentational information of the application, temporary settings of the application, user-defined application appearance or zoom magnification.

2. The apparatus of claim 1, wherein the at least one memory and computer program code are configured to, when run on the at least one processor, cause the apparatus to:
in response to the user-selection, open a first device application which is a counterpart application to that of the open application on the second device to which the user-selected shareable content relates.

3. The apparatus of claim 1, wherein the at least one memory and computer program code are configured to, when run on the at least one processor, cause the apparatus to:
in response to user-selection, instruct the second device to exit the open application of the second device to which the user-selected shareable content relates.

4. The apparatus of claim 1, wherein the at least one memory and computer program code are configured to, when run on the at least one processor, cause the apparatus to:
provide, using the application switcher, an indication of content available to the first device from one or more open applications of a second device when that second device is one or more of:
paired with the first device, connected to a network/cloud server that the first device is also connected to, and within a predetermined proximity of the first device.

5. The apparatus of claim 1, wherein the at least one memory and computer program code are configured to, when run on the at least one processor, cause the apparatus to:
provide visual cue(s) as to which indication(s) of content available to the first device are from:
one or more open applications of the first device itself; and/or
one or more open applications of the second device.

6. The apparatus of claim 1, wherein the at least one memory and computer program code are configured to, when run on the at least one processor, cause the apparatus to:
in response to selection of content of an open application on the second device, initiate a counterpart first device application on the first device to which at least part of that user-selected content is shareable.

7. The apparatus of claim 6, wherein the at least one memory and computer program code are configured to, when run on the at least one processor, cause the apparatus to:
in response to selection of content of an open application on the second device, initiate a default counterpart first device application.

8. The apparatus of claim 1, wherein the transient state information includes one or more of:
unsaved data, cursor positioning onscreen, one or more functional settings, current instances of temporary data, or position of screen.

9. The apparatus of claim 1, wherein the at least one memory and computer program code are configured to, when run on the at least one processor, cause the apparatus to:
allow for sharing of one or more open applications on the first device with the second device, wherein at least part of the content from the first device open applications is shareable in real time with open applications on a second device.

10. The apparatus of claim 1, wherein the at least one memory and computer program code are configured to, when run on the at least one processor, cause the apparatus to:
maintain synchronisation of content between the open application of the second device, to which the user-selected shareable content relates, and the first device application to which the shareable content is provided.

11. The apparatus of claim 1, wherein the at least one memory and computer program code are configured to, when run on the at least one processor, cause the apparatus to:
provide, using the application switcher, an indication of content available to the first device from respective one or more open applications on a plurality of other devices.

12. The apparatus of claim 1, wherein the apparatus is one or more of:
a portable electronic device, a laptop computer, a mobile phone, a Smartphone, a tablet computer, a personal digital assistant, a digital camera, a watch, a server, the first device, and a module/circuitry for one or more of the same.

13. The apparatus of claim 1, wherein the apparatus is one or more of:
a non-portable electronic device, a desktop computer, a monitor, a server, and a module/circuitry for one or more of the same.

14. The apparatus of claim 1, wherein the one or more open applications comprise one or more of a word processing application, a web browser application, a map application, a notepad application or spreadsheet application.

15. The apparatus of claim 1, wherein the transient state information is shared between the first device and second device upon prompting or upon detection of a change in the transient state information.

16. The apparatus of claim 1, wherein a subset of content provided by the second device and useable by the first device is used by the first device.

17. An apparatus, comprising:
at least one processor; and
at least one memory having computer program code stored thereon, the at least one memory and computer program code being configured to, when run on the at least one processor, cause the apparatus to:
provide for use by an application switcher of a first device, an indication of content available to the first device from one or more open applications on a second device, wherein at least part of the content of the one or more open applications of the second device is shareable in real time with an application on the first device, and wherein the application switcher provides an indication of content available to the first device that is provided by open applications on the first device in addition to the provision of the indication of content available to the first device that is provided by open applications on the second device to thereby provide an aggregated list of possible applications for access;
provide, in response to user-selection of content from the application switcher of the first device, the user-selected shareable content of the open application of the second device for use on the first device using a first device application; and
configure at least the first device application of the first device in accordance with the user-selected shareable content, wherein the content comprises transient state information associated with the open application of the second device to which the user-selected shareable content relates, such that the first device application is configured using the transient state information which includes one or more of window positioning onscreen, selection indication onscreen, scroll position onscreen, volume settings, presentational information of the application, temporary settings of the application, user-defined application appearance or zoom magnification.

18. A method, comprising:
providing an application switcher to a first device, the application switcher providing an indication of content available to the first device from one or more open applications on a second device, wherein at least part of the content of the one or more open applications of the second device is shareable in real time with an application on the first device, and wherein the application switcher provides an indication of content available to the first device that is provided by open applications on the first device in addition to the provision of the indication of content available to the first device that is provided by open applications on the second device to thereby provide an aggregated list of possible applications for access;
providing, in response to user-selection of content from the application switcher, the user-selected shareable content of the open application of the second device for use on the first device using a first device application; and
configuring at least the first device application of the first device in accordance with the user-selected shareable content, wherein the content comprises transient state information associated with the open application of the second device to which the user-selected shareable content relates, such that the first device application is configured using the transient state information which includes one or more of window positioning onscreen, selection indication onscreen, scroll position onscreen, volume settings, presentational information of the application, temporary settings of the application, user-defined application appearance or zoom magnification.

19. A non-transient computer readable medium programmed with computer program code that upon execution by a processor causes the processor to:
provide an application switcher to a first device, the application switcher providing an indication of content available to the first device from one or more open applications on a second device, wherein at least part of the content of the one or more open applications of the second device is shareable in real time with an application on the first device, and wherein the application switcher provides an indication of content available to the first device that is provided by open applications on the first device in addition to the provision of the indication of content available to the first device that is provided by open applications on the second device to thereby provide an aggregated list of possible applications for access;
provide, in response to user-selection of content from the application switcher, the user-selected shareable content of the open application of the second device for use on the first device using a first device application; and
configure at least the first device application of the first device in accordance with the user-selected shareable content, wherein the content comprises transient state information associated with the open application of the second device to which the user-selected shareable content relates, such that the first device application is configured using the transient state information which includes one or more of window positioning onscreen, selection indication onscreen, scroll position onscreen, volume settings, presentational information of the application, temporary settings of the application, user-defined application appearance or zoom magnification.

* * * * *